United States Patent Office 3,588,972
Patented June 29, 1971

3,588,972
STRETCH CARRIAGE FOR A FELT-STRETCHING MACHINE
Narve Hundseid, Baerum, near Oslo, Norway, assignor to Aktieselskabet Thunes Mekaniske Vaerksted, Oslo, Norway
Filed Feb. 24, 1969, Ser No. 801,733
Claims priority, application Norway, Jan. 25, 1969, 296
Int. Cl. D06c 3/00
U.S. Cl. 26—54                    4 Claims

ABSTRACT OF THE DISCLOSURE

The invention relates to stretch carriages for felt-stretching machines. Each stretch bearing is mounted in the stretch carriage by means of support means which bear against the running base of the stretch carriage and is further mounted in the stretch carriage by means of two screw spindles extending symmetrically about the axis of the stretch bearing, the screw spindles being rotatably mounted at the ends thereof in the stretch carriage and passing through corresponding nut elements in the stretch bearing.

---

The present invention relates to a stretch carriage for a felt-stretching machine or the like. Such stretch carriages are used for stretching felt or wire in a felt-stretching machine and consist of a mobile carriage mounted on tracks and provided with a stretch roll. The stretch roll is mounted in stretch bearings which in turn are mounted in the stretch carriage in such a way as to be displaceable with respect to the stretch carriage in the direction of stretch. For example, when a felt has been introduced into the felt-stretching machine, the stretch carriage is moved in direction away from the stationary roll which is ordinarily the drive roll for the felt in the felt-stretching machine, and the stretch carriage is secured in this position e.g. anchored to the tracks, the stretch bearings being thereafter adjusted within the stretch carriage for stretching of the felt.

The stretch bearings have hitherto been slidably mounted in the carriage by means of a slide guide and the displacement of the stretch bearings in the stretch carriage has usually been carried out by means of a screw spindle which is passed through each stretch bearing and is rotatably mounted at its ends in the stretch carriage. Such a construction entails the risk of the stretch bearings tipping in the slide guide as the screw spindle causes a moment of tipping on the stretch bearing upon displacement, and, in addition, the stretch carriage must be of strong construction and the dimensions thereof must be adapted to receive the weight of the stretch roll with stretch bearings.

In accordance with the invention it is proposed to provide a separate support member for each stretch bearing, for example wheels which bear against the running base of the stretch carriage, and further to mount each stretch bearing in the stretch carriage by means of two screw spindles. Said screw spindles are parallel and extend symmetrically about the stretch bearing axis in the direction of stretch, and are operated by a driving means. The said screw spindles are rotatably mounted at the ends thereof in the stretch carriage and are passed through corresponding nut elements in the stretch bearing.

The advantage of this embodiment is that the weight of the stretch bearings and the stretch roll mounted therein is transmitted directly to the running base, preferably to the tracks upon which the stretch carriage runs. Tipping of the bearing is effectively prevented by means of two screw spindles arranged symmetrically about the stretch axis and acting synchronously.

In order to mount the felt or wire in the felt-stretching machine, the stretch roll must be removable from the stretch bearings and the stretch bearings are therefore effected in such a manner as to permit of their being opened for removal of the stretch roll transversely of the roll axis. In accordance with the invention, the stretch bearing is in two parts so that the journal bearing of the stretch roll may be removed horizontally or in the direction of stretch, and the stretch carriage is then provided at one end with openings large enough to permit through passage of the journal bearings of the stretch roll.

Rapid mounting and demounting of the stretch roll is achieved in this manner. When demounting, the stretch bearings are opened and the stretch roll is supported, whereafter the carriage is moved away.

The stretch carriage is suitably effected in accordance with the invention so as to comprise two independent carriages which run on respective parallel tracks. This is a particularly advantageous embodiment in view of the aforementioned possibility of mounting and demounting of the stretch roll, since it is usually sufficient to release one side of the roll for introduction and removal of the felt, and, by employing two independent carriages, one carriage may be retained for support of the end of the stretch roll which is not released, while the carriage at the released end is moved away.

The invention is further explained with reference to the drawings which illustrate a preferred embodiment of a stretch carriage according to the invention.

Figure 3:
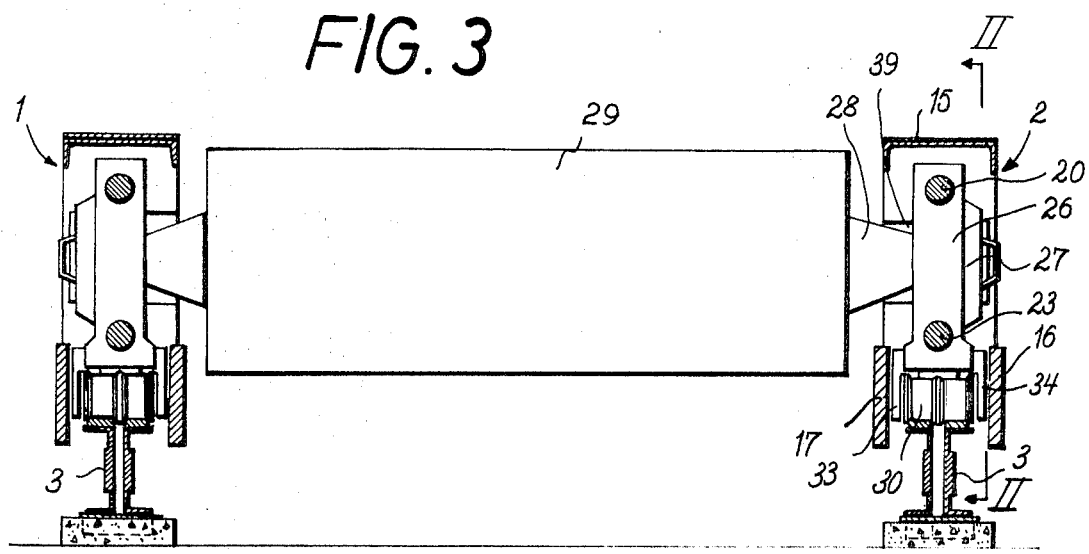
FIG. 3 shows a section along line III—III in FIG. 1.

As will be apparent from the four figures of the drawings, and particularly from FIG. 3, the stretch carriage is constructed with two independent carriages 1 and 2 which run on respective tracks 3. The carriages are identical in themselves, and only the right-hand carriage of FIG. 3, viz carriage 2, is further described in the following.

Figure 2:
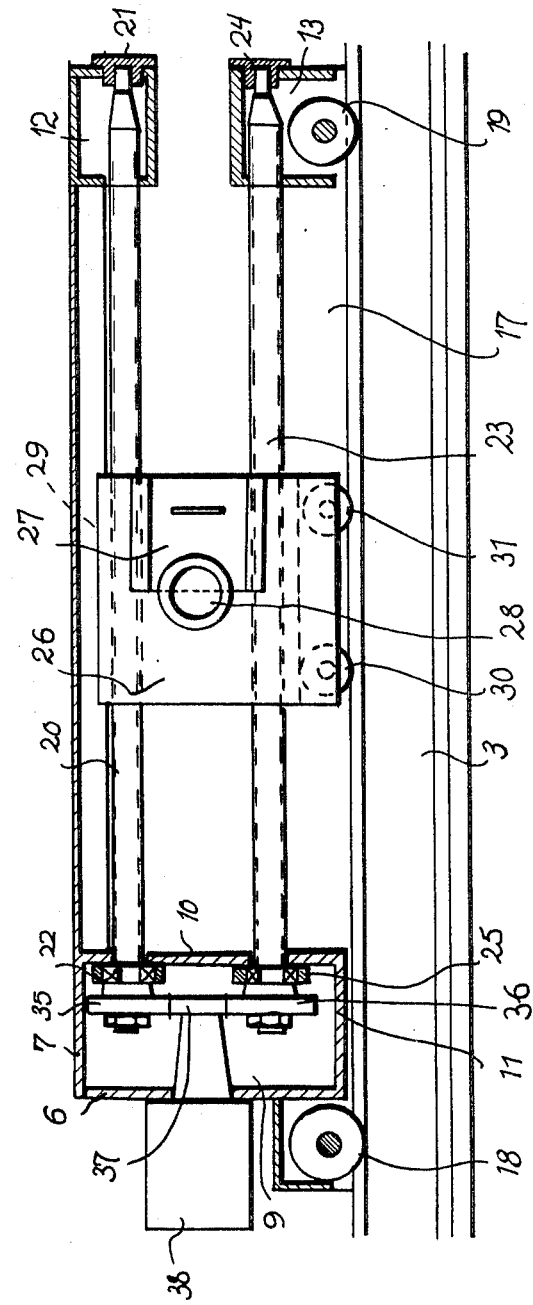
FIG. 2 shows a section approximately along line II—II in FIG. 3.
Figure 4:
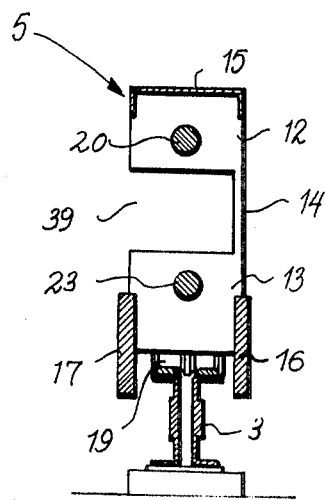
FIG. 4 shows a section along line IV—IV in FIG. 1.

The carriage 2 is constructed as a welded body having two end housings 4 and 5. The end housings are constructed as a welded plate unit. The housing 4 is provided with an end plate 6, a top plate 7, two side plates 8 and 9, a further end plate 10 and a bottom plate 11. The housing 5 is constructed in a somewhat different way as is apparent particularly from FIGS. 2 and 4. The housing 5 consists in actual fact of two boxes 12 and 13 which are interconnected by means of one side plate 14 (FIG. 4).

The two housings 4 and 5 are held together by means of channel beam 15 and two strong side plates 16 and 17. The running whels 18 and 19 are mounted in the two side plates 16 and 17 and support the carriage on the track 3.

A screw spindle 20 is mounted in the box 12 by means of a bearing sleeve 21 and is mounted in the housing 6 by means of a ball bearing 22. The screw spindle is passed freely through openings in the two housings 4 and 5. In the same manner a screw spindle 23 is mounted in the box 13 by means of a bearing sleeve 24 and is mounted in the housing 4 by means of a ball bearing 25. The screw spindle 23 is also freely passed through the openings in the two housings 4 and 5.

The two screw spindles 20 and 23 are passed through nut elements (not shown in detail) in the stretch bearing 26. The stretch bearing 26 is effected as a block construction and has an end piece 27 which may be removed whereby the journal bearing 28 of the stretch roll 29 indicated by broken lines, may be displaced from the stretch bearing in a horizontal direction.

The stretch bearing 26 is mounted on two support wheels 30 and 31 which run on the track 3 and are mounted in two downwardly directed shanks 33 and 34 on the stretch bearing 26.

Gear wheels 35 and 36 are mounted on one end of each screw spindle 20 and 23, respectively, within the housing 4. The said gear wheels are in engagement with a gear wheel 37 which is mounted on the shaft of a drive motor 38, the said drive motor being secured to the end wall 6 of the housing 4.

When in use, the stretch carriage here consisting of the two carriags 1 and 2, is moved to a position in which the felt or wire introduced is tightened and the two carriages 1 and 2 are locked in this position to the tracks 3 by means of members not shown but known per se, for example as shown in U.S. Pat. No. 1,514,748. Driving of the carriages 1 and 2 may be undertaken in various ways, and while no drive means are illustrated as mounted on the respective carriages, they can of course be used, as also for example in the above-recited patent. The carriages may also be displaced by means of external drive means which are connected to the carriages.

After the entire stretch carriage as such is positioned, the positions of the two stretch bearings are regulated in the stretch carriage by means of the drive motors 38 (as previously stated the carriage 1 is equipped in the same manner as carriage 2), and the necessary stretching of the felt is carried out. The stretch bearings rest on tracks 3, and the stretch carriage may therefore be of a light weight construction which is also apparent from the constructive embodiment illustrated.

Figure 1:
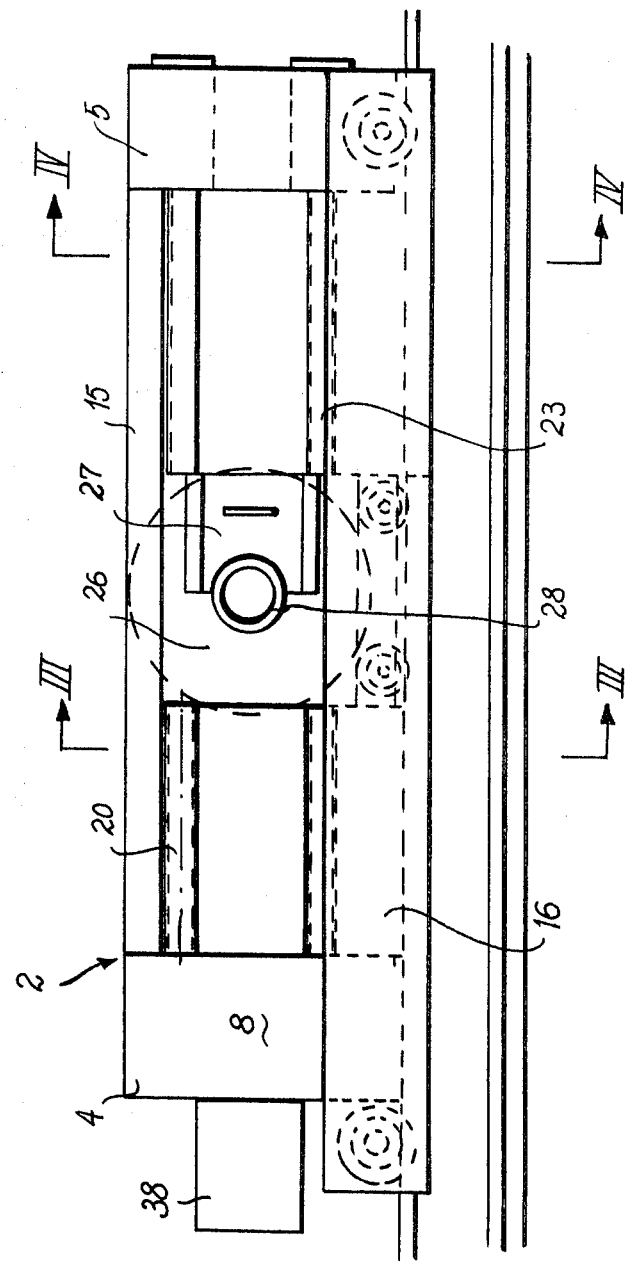
FIG. 1 shows a side view of a stretch carriage.

When the felt is to be removed from the stretch roll 29, the end piece 27 is removed and the roll 29 is supported in a maner known per se, whereafter the entire carriage 2 may be moved away in a direction toward the left in FIG. 1. The significance of the special embodiment of the housing will now become apparent. As shown, particularly in FIGS. 2 and 4, the end housing 5 is formed so as to permit an opening 39 in this housing. This opening is large enough to allow the journal bearing 28 to pass so that carriage 2 may be moved to the left in FIG. 1, until the journal bearing 28 is entirely free of the carriage. When remounting the stretch roll the sequence of the procedure is reversed.

Having described my invention, I claim:

1. In a machine for stretching felt or the like comprising a base, a stretch roll, a stretch carriage at each end of the stretch roll and mounted for movement on the base in a direction to stretch an endless band of felt or the like trained about said stretch roll and about a stationary roll of the machine, and a stretch bearing movable relative to each carriage and supporting an end of the stretch roll; the improvement comprising a pair of screw spindles for each carriage parallel to each other and to the direction of movement of the cariage, said screw spindles being mounted for rotation on the carriage on opposite sides of the axis of the stretch roll, each said bearing in screw-threaded engagement with a said pair of screw spindles, and means for simultaneously rotating the screw spindles of each said pair.

2. Apparatus as claimed in claim 1, said stretch bearing having means for releasably retaining an end of the stretch roll therein, said releasable retaining means comprising a portion of the bearing that is removable in a direction parallel to the screw spindles, each said carriage having an opening through one end thereof of a size to permit passage of the ends of the stretch roll after said removable portion is removed.

3. Apparatus as claimed in claim 2, the ends of each said pair of screw spindles being mounted for rotation in housings disposed at opposite ends of their corresponding carriage, said housing at said one end of said carriage having said opening disposed therein between the mountings of the associated ends of said screw spindles..

4. In a felt-stretching machine comprising a base, a stretch roll, a stretch carriage at each end of the stretch roll and mounted for movement on the base in a direction to stretch an endless band of felt or the like trained about said stretch roll and about a stationary roll of the machine, and a stretch bearing carried by and movable relative to each carriage and supporting an end of the stretch roll; the improvement comprising screw spindle means for each carriage parallel to the direction of movement of the carriage, said screw spindle means being mounted for rotation on the carriage, each said bearing being in screw-threaded engagement with said screw spindle means, means for simultaneously rotating said screw spindle means, each said stretch bearing having means for releasably retaining an end of the stretch roll therein, said releasable retaining means comprising a portion of the bearing that is removable in a direction parallel to the screw spindle means, each said carriage having an opening through one end thereof a size to permit passage of the end of the stretch roll after the corresponding removable portion is removed.

References Cited

UNITED STATES PATENTS

| | | | |
|---|---|---|---|
| 1,514,748 | 11/1924 | Wilson | 26—68 |
| 1,514,749 | 11/1924 | Wilson | 26—68 |
| 2,518,740 | 8/1950 | Albright | 26—68UX |
| 3,149,003 | 9/1964 | Christie et al. | 26—68X |

FOREIGN PATENTS

| | | | |
|---|---|---|---|
| 22,381 | 5/1883 | Germany | 26—68 |
| 9,652 | 1843 | Great Britain | 26—68 |

ROBERT R. MACKEY, Primary Examiner

U.S. Cl. X.R.

26—68